(No Model.)

E. A. THUSTON & G. E. GILL.
WHEEL TIRE.

No. 553,698. Patented Jan. 28, 1896.

WITNESSES
Jos. C. Stack.
Guy L. Hoyme.

INVENTORS
Eli A. Thuston,
George E. Gill,
by Finckel & Finckel, Attorneys

UNITED STATES PATENT OFFICE.

ELI A. THUSTON AND GEORGE E. GILL, OF COLUMBUS, OHIO.

WHEEL-TIRE.

SPECIFICATION forming part of Letters Patent No. 553,698, dated January 28, 1896.

Application filed May 17, 1895. Serial No. 549,662. (No model.)

*To all whom it may concern:*

Be it known that we, ELI A. THUSTON and GEORGE E. GILL, citizens of the United States, residing at Columbus, in the county of Franklin and State of Ohio, have invented certain new and useful Improvements in Wheel-Tires; and we do hereby declare the following to be a full, clear, and exact description of the invention, such as will enable others skilled in the art to which it appertains to make and use the same.

Our invention relates more particularly to elastic tires for vehicle-wheels which are intended to prevent the noise and jar incident to the use of the rigid and inflexible wheels at present in common use.

Several attempts have been made to provide a wheel having a cushioned metallic tire, but owing to their complexity and cost they do not appear to have been generally adopted.

The object of our invention is to provide a cushioned tire which shall be economically constructed and easily applied and which shall be durable and satisfactory in use.

Figure 1:
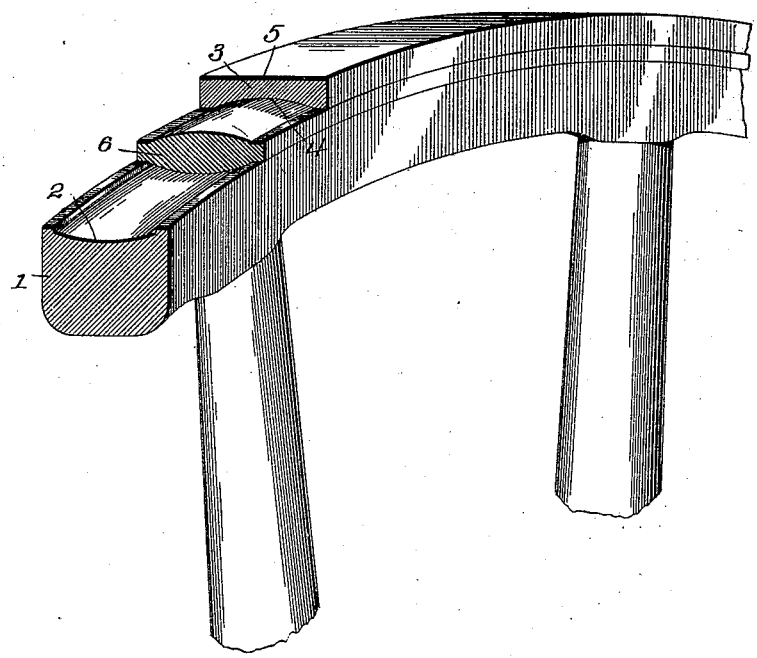
Figure 2:
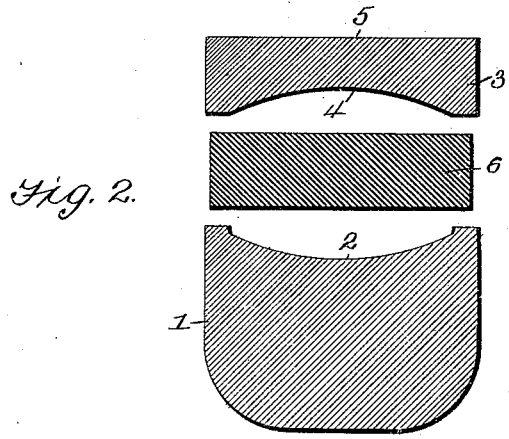

In the accompanying drawings, Figure 1 illustrates a sectional perspective view of a fraction of a wheel having our cushioned tire. Fig. 2 illustrates a sectional view of the parts separated.

In practicing our invention we first groove or channel out the rim or fellies 1 of the wheel, the groove being rounded, as indicated at 2. We then form upon the inner side of the metal tire 3 a channel or groove 4 rounded like that upon the rim of the wheel, the outer surface of the metal tire being made straight in cross-section, as shown at 5. In putting on the elastic band 6 it is first fastened at a point on the rim and then stretched tightly around the groove, and in this stretching the elastic material will sink into and fill the groove or concave, as shown in Fig. 1. The metal tire is then heated and shrunk onto the rubber band. In doing this the rubber is compressed by the concaved bottom of the tire, which is also filled, as shown in Fig. 1.

The compression of the rubber into both the rim and tire prevents the accidental removal from the wheel of either the elastic cushion or the tire.

Instead of shrinking on the tire in the usual way the rim may be expanded out to the tire by such a device as shown in the patent granted to Hays and Thuston, No. 522,162, dated June 26, 1894.

It will be seen that with our invention the only part which we employ in addition to what has heretofore been employed in the ordinary wheel is the elastic cushion, which, by means of our improvements, we are enabled to use without the aid of any additional parts.

What we claim, and desire to secure by Letters Patent, is—

A wheel having its rim made with a circumferential groove curved or rounded throughout its cross section, a flat elastic band in said groove, and a tire having a groove around its inner side curved or rounded throughout its cross section whereby when the tire is shrunk onto the elastic band the latter is compressed inward and outward toward and at its central line, substantially as shown and described.

In testimony whereof we affix our signatures in presence of two witnesses.

ELI A. THUSTON.
      GEORGE E. GILL.

Witnesses:
 GEORGE M. FINCKEL,
 WM. B. JORDAN.